M. J. LANGTON.
BEAN CLIPPER.
APPLICATION FILED OCT. 8, 1915.
1,190,303.
Patented July 11, 1916.
3 SHEETS—SHEET 1.
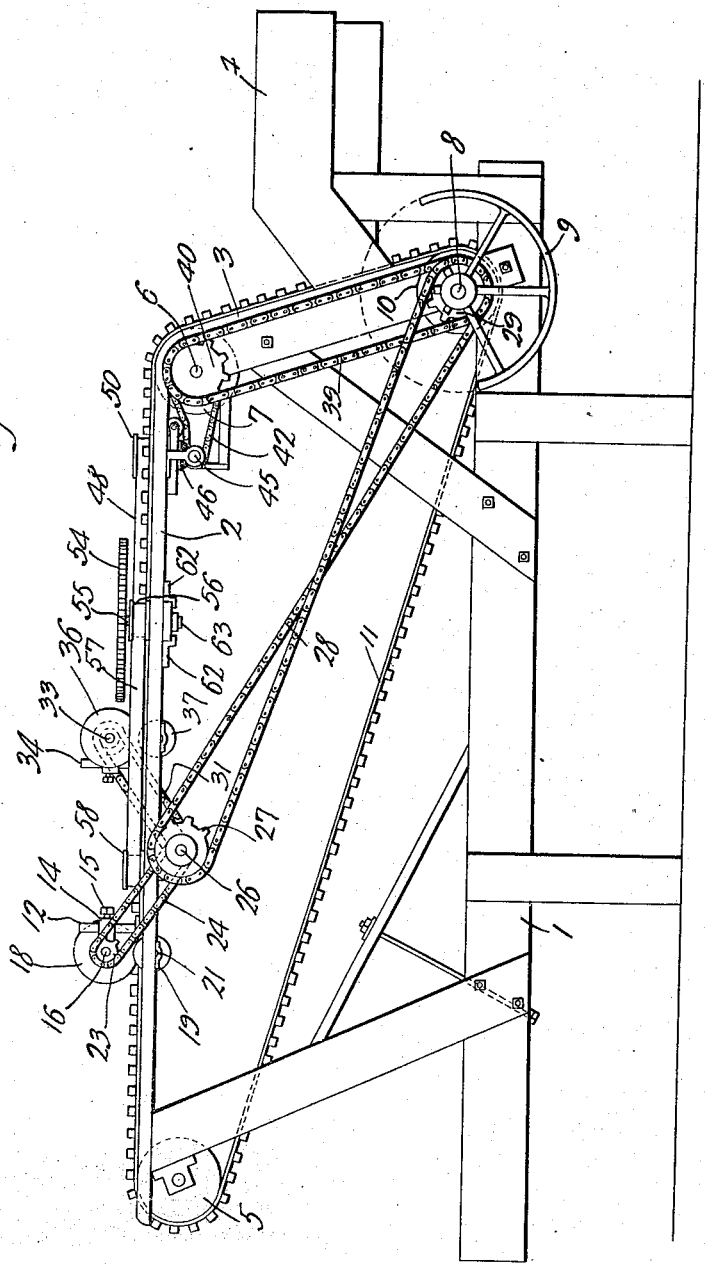
Witnesses
M. J. Langton Inventor
by
Attorneys

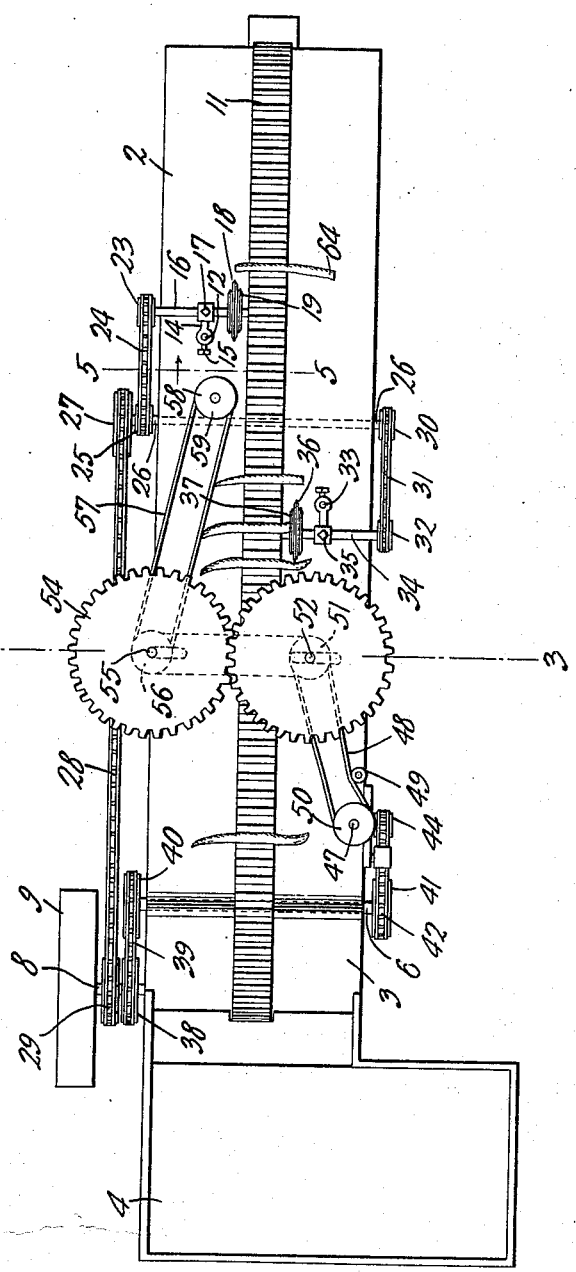

M. J. LANGTON.
BEAN CLIPPER.
APPLICATION FILED OCT. 8, 1915.
1,190,303.
Patented July 11, 1916.
3 SHEETS—SHEET 3.
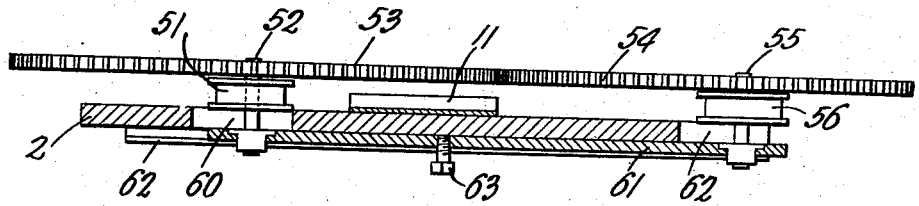
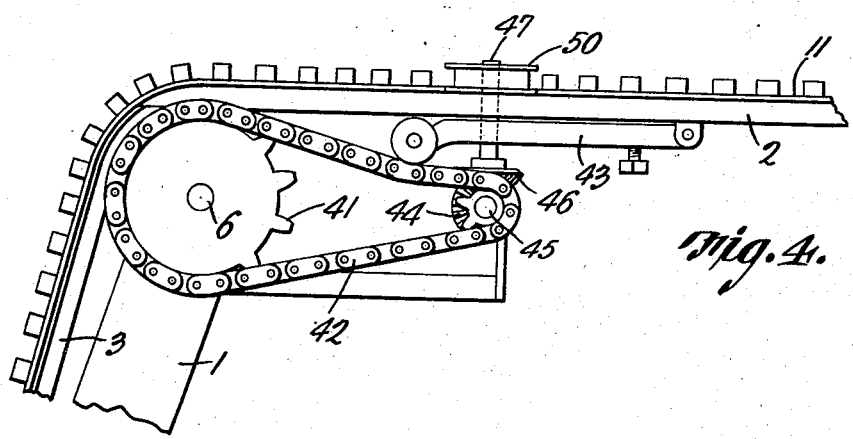
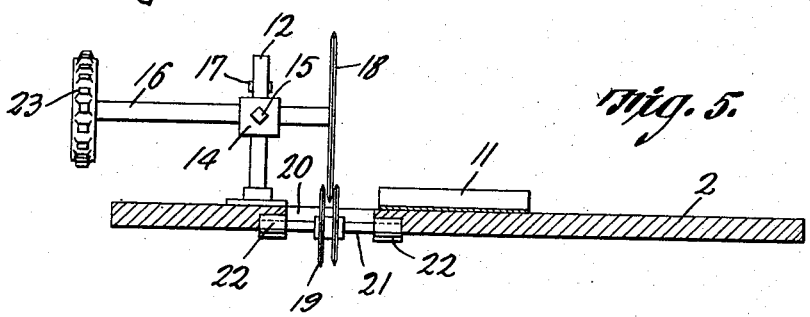
Witnesses
M. J. Langton, Inventor
by
Attorneys

UNITED STATES PATENT OFFICE.

MORGAN J. LANGTON, OF OSWEGO, NEW YORK.

BEAN-CLIPPER.

1,190,303.  Specification of Letters Patent.  Patented July 11, 1916.

Application filed October 8, 1915. Serial No. 54,867.

*To all whom it may concern:*

Be it known that I, MORGAN J. LANGTON, a citizen of the United States, residing at Oswego, in the county of Oswego and State of New York, have invented a new and useful Bean-Clipper, of which the following is a specification.

The device forming the subject matter of this application is a bean clipper, and one object of the present invention is to provide novel means whereby the beans may be adjusted longitudinally, so as to coöperate with knives whereby the ends of the beans are cut off.

Another object of the invention is to improve the construction of the knives and the means whereby the knives are operated.

A further object of the invention is to provide novel means whereby the beans are conveyed first into coöperation with guiding means whereby the beans are moved endwise and then into coöperating relation with the knives.

It is within the province of the disclosure to provide novel means whereby the bean guides may be adjusted so as to define different angles with respect to the conveyer which moves between the bean guides.

The invention aims to improve the driving mechanism whereby the several movable parts of the structure are actuated.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings: Figure 1 shows the invention in side elevation; Fig. 2 is a top plan; Fig. 3 is a fragmental transverse section taken approximately on the line 3—3 of Fig. 2; Fig. 4 is a fragmental side elevation; Fig. 5 is a cross section taken approximately on the line 5—5 of Fig. 2, parts being omitted.

In carrying out the present invention there is provided a supporting structure embodying a frame 1 carrying a horizontal table 2 provided at one end with an incline 3 against which discharges a bean hopper 4. Journaled for rotation at the rear end of the supporting structure is a roller 5, and journaled for rotation at the other end of the supporting structure is a shaft 6 carrying a roller 7. Journaled in the supporting structure below the roller 6 is a shaft 8 provided with a drive wheel 9 and carrying a roller 10. About the rollers 5, 7 and 10 is looped a belt conveyer 11 adapted to traverse the table 2 and the incline 3.

Upstanding from the table 2 at one side of the belt conveyer 11 and near to the rear end of the table is a vertical post 12 on which is mounted to move for vertical adjustment, a forwardly extended arm 14 held in place by a set screw 15. Journaled in the arm 14 and longitudinally adjustable therein is a transverse shaft 16, held against longitudinal movement but for rotation by means of a set screw 17 threaded into the arm 14, it being understood that the arm 14 is suitably bushed, as is common, to permit the adjustment above mentioned and to permit the rotation of the shaft 16. The shaft 16 carries a rotary knife 18 which, as shown in Fig. 5 operates above a slot 20 in the table 2. Secured to the table 2 on opposite sides of the slot 20 are bearings 22 to which is mounted for endwise movement and for rotation a shaft 21 carrying knives 19 located on opposite sides of the knife 18.

Secured to one end of the shaft 16 is a sprocket wheel 23 about which is trained a sprocket chain 24 engaged with a sprocket wheel 25 on a shaft 26 journaled in the supporting structure. The shaft 26 carries a sprocket wheel 27 about which is trained a crossed sprocket chain 28 engaged with a sprocket wheel 29 on the drive shaft 8. Secured to the shaft 26 is a sprocket wheel 30 engaged by a sprocket chain 31 passed about a sprocket wheel 32 on a transverse shaft 33 which, like the shaft 16 is held by a post 34 and an arm 35, the shaft 33 carrying a rotary knife 36 coöperating with knives 37 constructed like the knives 19, the knives 36 and 37 being located on one side of the belt conveyer 11 and the knives 18 and 19 being located on the other side of the belt conveyer. The shaft 8 carries a sprocket wheel 38 about which is trained a sprocket chain 39 engaged with a sprocket wheel 40 on the shaft 6.

That end of the shaft 6 which is remote from the sprocket wheel 40 carries a sprocket wheel 41 about which is trained a sprocket chain 42 engaged by a chain tightener 43, the chain 42 being passed about a sprocket wheel 44 on a horizontal shaft 45 journaled in the frame, the shaft 45 being connected by beveled pinions 46 to an upright shaft 47 journaled for rotation in the frame and carrying a pulley 50 about which is trained a belt 48 engaged by an idler 49, the belt 48 being passed about a pulley 51 on a shaft 52 carrying a gear wheel 53 meshing into a gear wheel 54 on a shaft 55 carrying a pulley 56 operating a belt 57 trained around an idle pulley 58 carried by a shaft 59 supported in the table 2. The shafts 52 and 55 operate through slots 60 in the table 2, the lower ends of the shafts being mounted in a carriage 61 mounted to reciprocate for adjustment transversely of the table 2, in guides 62 carried by the under face of the table, the carriage 61 being held in adjusted positions by any suitable means such as a set screw 63 threaded into a carriage 61 and adapted to engage the table. The belts 57 and 48 are disposed in converging relation, as Fig. 1 will show and lie upon opposite sides of the belt conveyer 11.

The drives are as follows: When the shaft 8 is rotated by means of the drive wheel 9, the sprocket chain 39 rotates the shaft 6 and thus the belt conveyer 11 is operated, the belt conveyer being operated not only by the roller 7 on the shaft 6 but, as well, by the roller 10 on the shaft 8. From the shaft 6, rotation is imparted to the shaft 45 by means of the sprocket chain 42. The beveled pinions 46 drive the shaft 47 from the shaft 45, the belt 48 and the pulley 51 rotating the gear wheel 53, the gear wheel 53 driving the gear wheel 54, the pulley 56 operating the belt 57. From the shaft 8 rotation is imparted to the shaft 26 by the sprocket chain 28, the shaft 26 driving the shaft 16 through the instrumentality of the sprocket chain 24, and the shaft 16 rotating the knife 18. From the shaft 26, rotation is imparted to the knife 36 by means of the shaft 34 and the sprocket chain 31.

In practical operation, beans 64 are selected out of the hopper 4 by the belt conveyer 11 and lifted along the incline 3, the beans traversing the table 2. Referring to Fig. 2, the right hand ends of the beans first come into contact with the belt 48 and are moved to left the desired distance, whereupon the right hand ends of the beans come into contact with the knives 36 and 37, the right hand ends of the beans being cut off. Subsequently, the left hand ends of the beans come into contact with the belt 57, the beans being moved to the right, and the left hand ends of the beans being cut off by the knives 18 and 19. By loosening the set screw 63 or manipulating any equivalent structure substituted therefor, the carriage 61 may be moved endwise, thus to shift the positions of the belts 57 and 48.

A careful inspection of the various driving trains will disclose the fact that the belts 57 and 48 move faster than does the belt conveyer 11. As a consequence, the stems of the beans are flexed forwardly, as the beans are carried along by the conveyer 11, and the stems thus are prevented from interfering with the severing of the proper amount of the ends of the beans by the knives 18 and 36.

Having thus described the invention, what is claimed is:—

1. In a device for cutting off the ends of beans, a supporting structure; a conveyer mounted to move thereon; inclined belts located on opposite sides of the conveyer; knives in advance of the belts; and means for driving the belts at a higher speed than the conveyer, thereby to advance the stems of the beans and to facilitate the cutting of the beans by the knives.

2. In a device of the class described, a supporting structure; a carriage mounted to move for adjustment transversely of the supporting structure; means for holding the carriage in adjusted positions; pulleys mounted on the carriage; belts extended in opposite directions from the respective pulleys and disposed in converging relation; means for operating the belts; knives disposed to the rear of the belts; and a conveyer operating between the respective knives and the respective belts.

3. In a device of the class described, a supporting structure; a carriage mounted to move transversely of the supporting structure; means for holding the carriage in adjusted positions transversely of the supporting structure; pulleys mounted on the carriage; means for operatively connecting the pulleys, whereby one pulley will rotate the other pulley; means for driving one pulley; converging belts driven by the pulleys; knives operating in the rear of the belts; and a conveyer operating between the respective belts and the respective knives.

4. In a device of the class described, a supporting structure; a carriage mounted to move transversely of the supporting structure for adjustment; means for holding the carriage in adjusted positions; pulleys mounted on the carriage; belts carried by the pulleys; intermeshing gear wheels operatively connected with the pulleys; a conveyer operating between the belts, the belts being disposed in converging relation; and knives operating to the rear of the belts.

In testimony that I claim the foregoing as my own, I have hereto affixed my signature in the presence of two witnesses.

MORGAN J. LANGTON.

Witnesses:
FRED McGUIRE,
C. A. LARSON.

Copies of this patent may be obtained for five cents each, by addressing the "Commissioner of Patents, Washington, D. C."